United States Patent
Roeckel et al.

(12) 
(10) Patent No.: US 6,634,226 B2
(45) Date of Patent: Oct. 21, 2003

(54) PROTECTIVE GRATING FOR A MASS FLOW RATE SENSOR IN A CHANNEL OF SUCTIONED AIR

(75) Inventors: Herbert Roeckel, Ditzingen (DE); Heinz Rilling, Eberdingen (DE); Thomas Lenzing, Benningen (DE); Holger Krebs, Erdmannshausen (DE); Uwe Konzelmann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/009,357

(22) PCT Filed: Mar. 7, 2001

(86) PCT No.: PCT/DE01/00855

§ 371 (c)(1), (2), (4) Date: May 31, 2002

(87) PCT Pub. No.: WO01/67049

PCT Pub. Date: Sep. 13, 2001

(65) Prior Publication Data

US 2003/0126925 A1 Jul. 10, 2003

(30) Foreign Application Priority Data

Mar. 10, 2000 (DE) .......................................... 100 11 709

(51) Int. Cl.$^7$ ................................................ G01F 1/68
(52) U.S. Cl. .................................................. 73/204.21
(58) Field of Search .............................. 73/202, 202.5, 73/204.21, 204.22

(56) References Cited

U.S. PATENT DOCUMENTS 3,857,751 A * 12/1974 Jacobs ........................ 428/217
4,343,435 A * 8/1982 Anderton et al. ........... 239/499
4,433,576 A    2/1984 Shih et al.
4,600,622 A * 7/1986 Carlson et al. ............. 428/135
5,452,610 A    9/1995 Kleinhans et al.

FOREIGN PATENT DOCUMENTS

| DE | 31 35 794 | 3/1983 |
|---|---|---|
| DE | 43 38 891 | 9/1994 |
| DE | 196 37 647 | 3/1998 |
| DE | 196 52 753 | 6/1998 |
| DE | 42 28 484 | 10/1998 |
| DE | 197 35 664 | 2/1999 |
| DE | 197 35 891 | 2/1999 |
| DE | 199 42 501 | 3/2001 |
| DE | 199 42 502 | 3/2001 |
| JP | 2000 304 585 | 11/2000 |
| WO | WO 01 18 497 | 3/2001 |

* cited by examiner

Primary Examiner—Harshad Patel
(74) Attorney, Agent, or Firm—Kenyon & Kenyon

(57) ABSTRACT

A device for measuring at least one parameter of a medium flowing in a line, particularly the intake-air volume of an internal combustion engine. Liquid particles contained in the line act upon a measuring element and influence a characteristic curve of the measuring element which is used to determine parameters of the flowing medium. The characteristic curve of the measuring element can be changed disadvantageously by solid-matter particles. In order to reduce the action of solid-matter particles on the measuring element, a protective grating is proposed in which side walls of channels of the protective grating form various angles of intersection with the flow direction. Solid-matter particles are thereby diverted into a path of motion around the measuring element.

10 Claims, 4 Drawing Sheets

PROTECTIVE GRATING FOR A MASS FLOW RATE SENSOR IN A CHANNEL OF SUCTIONED AIR

FIELD OF THE INVENTION

The present invention relates to a device for measuring at least one parameter of a medium flowing in a line.

BACKGROUND INFORMATION

German Published Patent 197 35 891 Application No. describes a measuring body, insertable into a clean channel of an intake line of an internal combustion engine, for determining the mass of the intake air, which has a flow channel and a measuring channel that is essentially inclined in relation to a longitudinal axis of a line, and which subdivides into an S-shaped deflection channel adjoined thereto. A measuring element is arranged in the measuring channel. The measuring element can be constructed as a micromechanical sensor part having a dielectric membrane, as is known, for example, from the German Published Patent Application No. 43 38 891 and U.S. Pat. No. 5,452,610, respectively. Because of the entry of water into the intake line, for example, due to a roadway wet from rain, the measuring element may become contaminated. Natural components of dissolved salts contained in this spray water then cause a drift in the characteristic as the result of the buildup of salt crusts on the membrane of the sensor part. It may be that the inclination of the measuring body forms a screened region, however, dirt or liquid particles nevertheless get into the measuring channel.

From German Published Patent Application No. 197 35 664, a device is already known in which the measuring element is positioned within a tubular member through which the medium flows, an upstream end of the tubular member extending into a filter chamber, and there having inlet openings on a lateral surface to reduce the action of dirt particles or water droplets on the measuring element. Particularly in the case of heavily polluted air and a high water content in the intake air of the internal combustion engine, the danger exists that the air filter will become saturated with water which then passes through the filter mat and, in so doing, takes along dirt particles. On the downstream side of the air filter, the actual clean side, the danger now exists that the intake air will again carry along dirt particles and water droplets from the filter surface which then deposit in an undesirable manner on the measuring element, and which lead to measuring errors or a malfunction of the measuring element. By the arrangement of the inlet openings on the lateral surface, the tubular member according to the related art reduces the danger of deposits on the measuring element; however, a correspondingly long design of the tubular member causes an undesirable pressure drop which leads to a decrease in measuring sensitivity. In addition, given a fluid entry of 20 liter/hour resulting during operation of a motor vehicle, the reduction of the action of liquid/solid-matter particles on the measuring element is too small.

German Published Patent Application No. 196 52 753 describes a device having a measuring element, the device containing a flow rectifier and a grating for stabilizing a measuring signal. However, no further grating or element is used to protect the measuring element from liquids or solid-matter particles.

It has furthermore been proposed to use a repelling grating in a line to separate liquid particles from streaming air or a gas. Such a repelling grating, connected upstream of an inner pipe or in the line, influences the air/water mixture streaming toward the measuring element in such a way that the liquid particles are guided to a pipe wall or a line wall, while the air remains in a center of the inner pipe.

A different characteristic appears in response to the throughput of a mixture with air and dust in the line. Because of its still higher inertia compared to a liquid, the dust, in response to a change in the direction of flow forced by the side walls employed, changes its path only by reflection at the side wall, the principle of angle of incidence equal to angle of reflection being valid. Depending on the orientation of the side wall and the point of impact, a certain particle rejection thereby results, that is to say, a certain portion of the particles striking on the repelling grating is deflected by a reflection in the direction of the wall. The remaining part, after two reflections at the side walls, once more exhibits the main flow direction, and thus can strike, unhindered, on the measuring element downstream of the repelling grating.

SUMMARY OF THE INVENTION

In comparison, the device of the present invention has the advantage that the deflection of solid-matter particles and liquid particles is improved in a simple manner by varying the orientation of the side walls with respect to the main flow direction over their extension in the main flow direction.

It is advantageous to influence the path of motion of the solid-matter particles in the streaming medium by the formation of the side walls in such a way that it runs past the measuring element, since in this manner, the measuring element is not soiled.

The possibility of positive or negative angles of intersection of the side walls with the flow direction has the advantage that it permits more variations in the design.

The continuous curve of a channel has the advantage that the danger of a separation of the flow possibly arising is reduced, whereby otherwise an increased signal noise is caused.

The use of a tubular member in the line of the device has the advantage that additional protection is attained for the measuring element.

DETAILED DESCRIPTION

Figure 1:
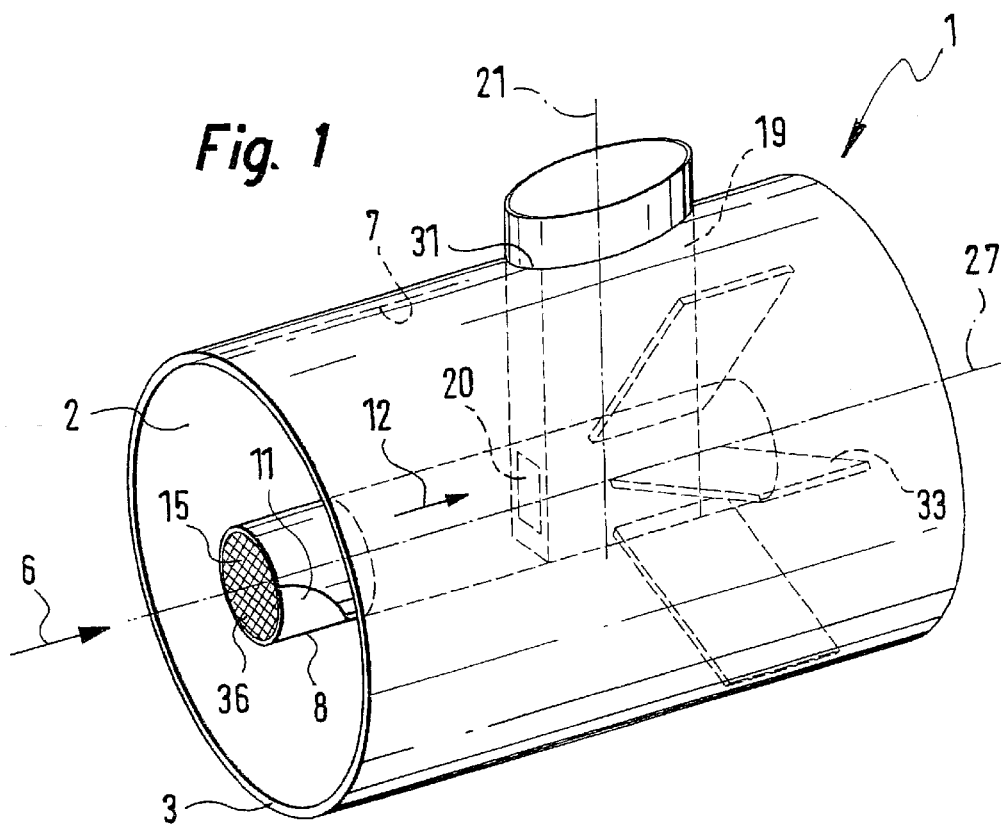
FIG. 1 shows an example of a device according to the present invention in a pipe stub.

FIG. 1 shows a device 1 for measuring at least one parameter, particularly an air-volume flow, of a medium flowing in line 2, especially the intake-air volume of an internal combustion engine.

Parameters of a flowing medium are, for example, the air-volume flow for ascertaining an air mass, a temperature, a pressure or a flow velocity, which are determined by suitable sensors. It is possible to use device 1 for measuring further parameters. This can be carried out by using two or more sensors, one sensor also being able to ascertain two or more parameters. Line 2 has a wall 3. The medium flows in line 2 in main flow direction 6, indicated by an arrow. Line 2 has an inner wall 7. Provided in line 2 is, for example, a tubular member 8 running with radial clearance with respect to line 2 and circumflowed by the medium. Tubular member 8 has a flow-through channel 11 and a protective grating 15 situated in the region of its upstream end. Plastic, metal, ceramics or glass can be used as material for protective grating 15. For example, plate-shaped protective grating 15 made of plastic can be produced by injection molding or by introducing grating openings 44 using a material-removing method. Downstream, somewhat removed from protective grating 15, a flow direction 12 prevails in flow-through channel 11. Flow direction 12 runs, let us say, parallel to main flow direction 6. Line 2 has a center line 27 which, for example, is also the center line of tubular member 8.

For instance, a measuring member 19 extends into tubular member 8. For example, measuring member 19 is partially inserted through an insertion opening 31 in wall 3 and an insertion opening 22 in a wall of tubular member 8, and projects with a free end into flow-through channel 11. One skilled in the art is familiar with such a measuring member 19 from German Published Patent Application No. 197 35 891, which is intended to be part of this disclosure. The air volume drawn in by the internal combustion engine is arbitrarily alterable by a throttle valve (not shown), positioned downstream of tubular member 8 in the intake manifold of the internal combustion engine.

To ascertain the intake-air mass of the internal combustion engine, measuring member 19 is provided which has an essentially elongated and rectangular-shaped design and which extends along a longitudinal axis 21. Longitudinal axis 21 runs essentially perpendicular to center line 27, and consequently also to main flow direction 6. In this context, a connector end of measuring member 19 accommodating the electrical connections, e.g. in the form of blade contacts, remains, for instance, outside of line 2. Provided in known manner in measuring member 19 is a measuring element 23 that is in contact with the air flowing through flow-through channel 11 and by which the air-volume flow drawn in by the internal combustion engine is determined. For example, measuring element 23 can be a temperature sensor as is known from German Patent No. 42 28 484, a pressure sensor as is used in the German Published Patent Application No. 31 35 794, or an air-volume sensor, which ascertains the corresponding parameters. Selected here as an example for the various sensors is an air-volume sensor which, for instance, is arranged in measuring member 19 that, for example, has an inlet opening 20 into which the medium flows. For example, measuring element 23 can be constructed in known manner in the form of at least one temperature-dependent resistor. In particular, it is possible, as is described, for example, in the German Published Patent Application No. 43 38 891 and the U.S. Pat. No. 5,452,610, respectively, to construct measuring element 23 as a micromechanical component which has a dielectric membrane upon which resistor elements are formed. It is also conceivable to introduce measuring element 23 into line 2 or tubular member 8 without measuring member 19. Located on tubular member 8 are, for instance, at least two braces 33 which are used to support tubular member 8 in line 2.

In addition to supporting tubular member 8 in the air flow between line 2 and tubular member 8, braces 33 cause an increase in the pressure drop, so that the air quantity flowing through flow-through channel 11 increases, and secondly, braces 33, in an intended manner, bring about a rectification of the intake-air flow. Tubular member 8 can also be arranged in line 2 without braces 33, e.g., it is secured to measuring member 19.

A design of protective grating 15 is clarified more precisely in the following FIGS. 2, 4 and 5. To that end, only briefly:

Liquid droplets deposit on protective grating 15 and are conducted to an inner wall 7 of line 2 or of tubular member 8, and thereby move past inlet opening 20 of measuring member 19 or past measuring element 23.

Further downstream of protective grating 15, a flow direction 12, which is nearly parallel to the center line of tubular member 8, prevails in flow-through channel 11.

Figure 2:
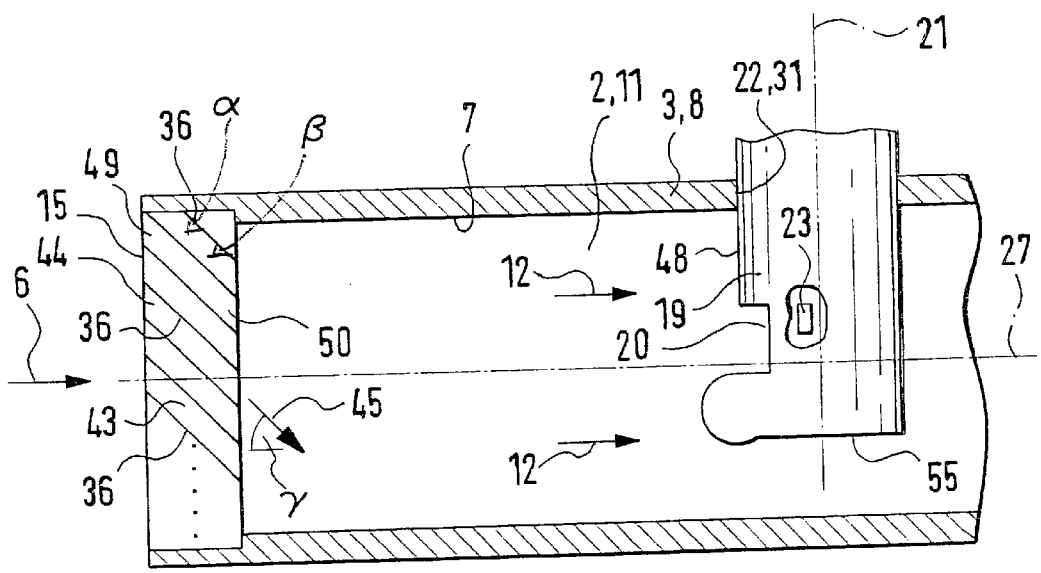
FIG. 2 shows an axial cross-section in the longitudinal direction in FIG. 1.

FIG. 2 shows an axial cross-section in the longitudinal direction in FIG. 1. The same reference numerals as in FIG. 1 are used for identical or equally-acting parts. Protective grating 15 can be seen having side walls 36 which run inclined by a specific deflection angle with respect to center line 27. Side walls 36 are, for example, parallel to plug-in axis 21 and perpendicular to plug-in axis 21, or stand perpendicular one upon the other and are arranged in any orientation about center line 27. Side walls 36 form channel openings 44 which, at least transverse to flow direction 6, 12, are triangular, or are round or oval, or are four-cornered as in this exemplary embodiment. The medium flows in through channel openings 44 and, viewed downstream, leaves protective grating 15 diverted in a different direction 45, indicated by an arrow, after protective grating 15. For example, it is also possible to provide no tubular member 8, so that, for instance, protective grating 15 extends over the entire cross-section of line 2. Measuring member 19 has a front surface 48 against and around which the medium flows first. A lower surface 55 is formed by the free radial end of measuring member 19.

A channel 43, formed by two side walls 36, has, for example, a first section 49 in 0which side wall 36 forms an angle of intersection α with flow direction 12. In a second section 50, side wall 36 of channel 43 forms an angle of intersection β with flow direction 12 which is larger than angle of intersection α.

Figure 3:
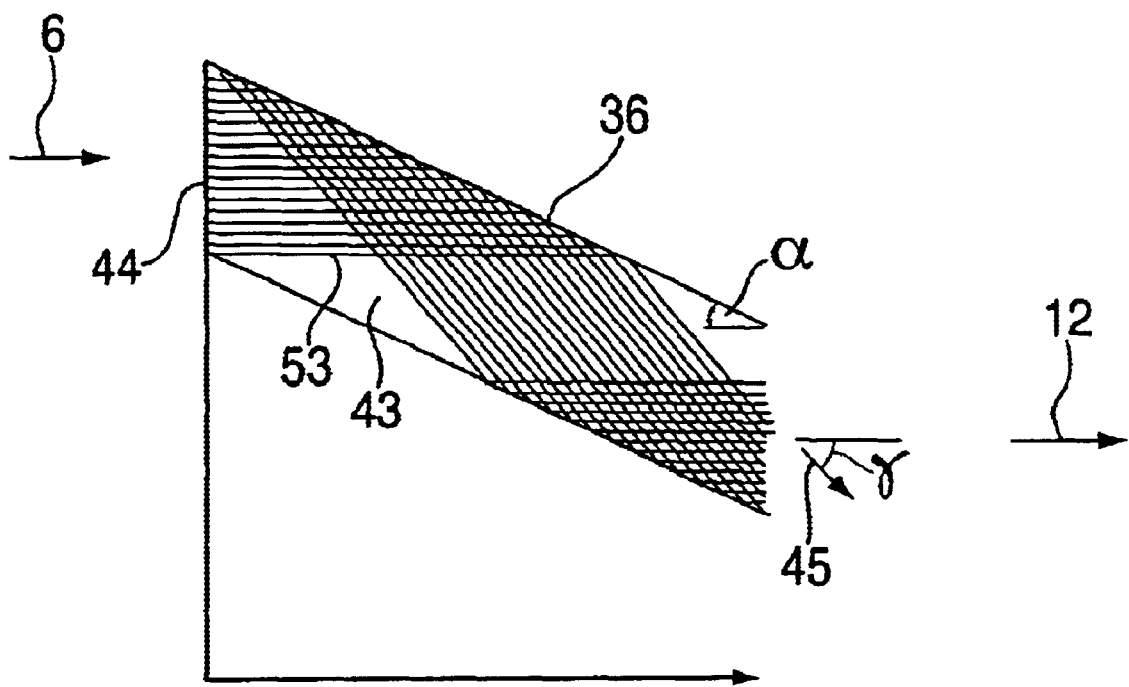
FIG. 3 shows a uniflow-current channel according to the related art.

FIG. 3 shows a channel 43 of a protective grating 15 according to the related art. The medium flows into channel opening 44 of channel 43 in main flow direction 6. Distributed uniformly over the cross-section of channel opening 44 are twenty lines 53 which show paths of motion of one particle each in channel 43. A part of the particles is reflected once at only one side wall 36 and thereupon leaves channel 43 again downstream in a direction 45. Direction 45 runs at an angle δ to flow direction 12. Angle δ is different from zero. A certain portion of lines 53 shows paths of motion in channel 43 with double reflection, one reflection each at each of side wall 36, so that these particles leave a channel outlet again downstream approximately parallel to flow direction 12, and thus are able to strike unhindered on measuring element 23 provided downstream.

Figure 4A:
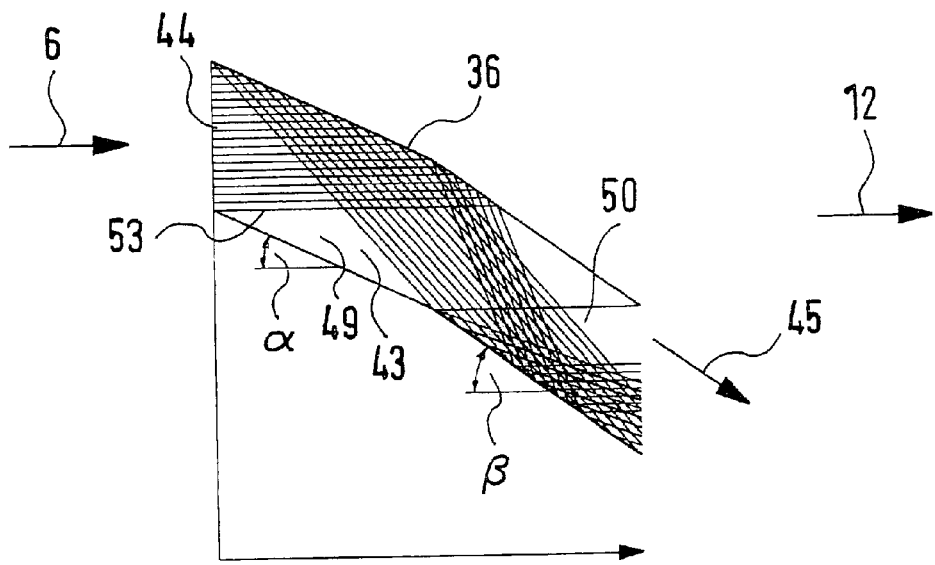
FIG. 4a is a first illustration of an axial cross-section through a uniflow-current channel constructed according to the present invention.

FIGS. 4a and b show two examples of the design according to the present invention of protective grating 15 of device 1. FIG. 4a shows a channel 43 of protective grating 15 which has, for example, a first section 49 and a second section 50 downstream. The side-wall sections bounding first section 49 form with flow direction 12 an angle of intersection α which here, for example, is 25 degrees. The side-wall sections bounding second section 50 form with flow direction 12 an angle of intersection β which, for example, is 35 degrees. The number of paths of motion of individual representing lines 53 which, upon emergence from channel 43, run parallel to flow direction 6, 12 downstream of channel 43 has been reduced compared to the related art according to FIG. 3. Improvement of the protection of measuring element 23 from striking particles is thereby ensured.

Figure 4B:
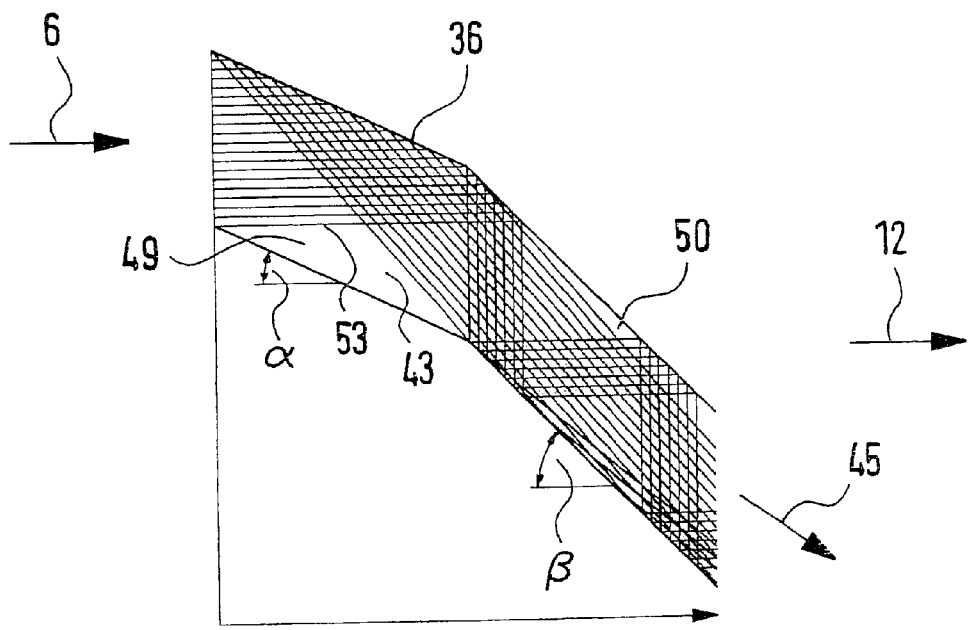
FIG. 4b is a second illustration of an axial cross-section through a uniflow-current channel constructed according to the present invention.

FIG. 4b shows an exemplary embodiment of channel 43 having an angle of intersection β which, in this case, is 45°. The angles of intersection can be positive and negative, i.e. all or only a part of them can be negative.

Figure 5A:
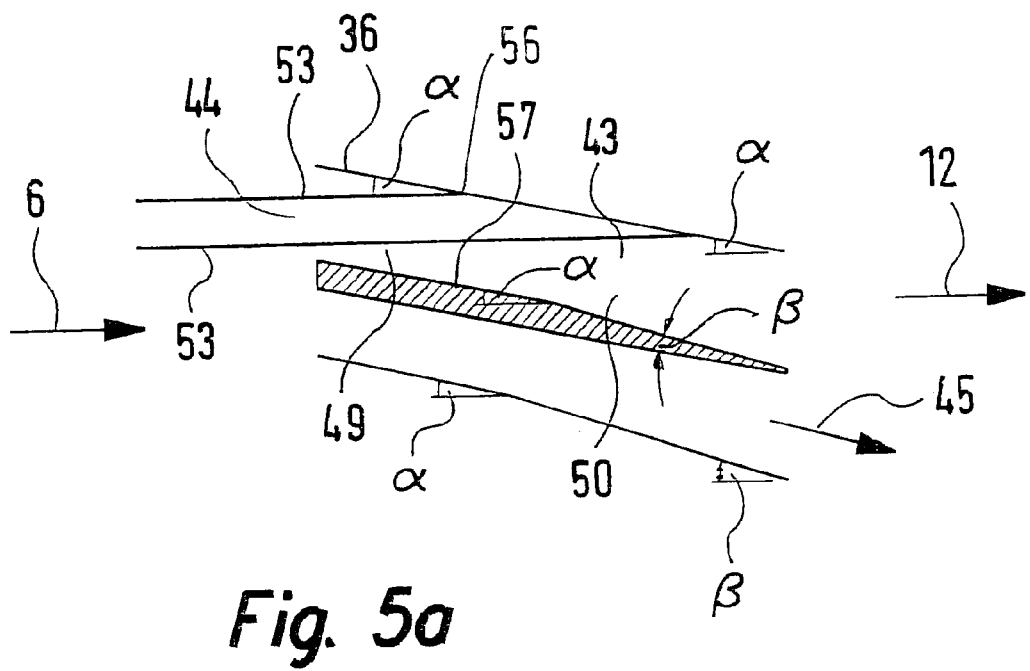
FIG. 5a shows a further exemplary embodiment of the device according to the present invention in partial representation.

FIGS. 5a and b show further exemplary embodiments of channel 43. FIG. 5a shows a channel 43 whose upper side wall 56 forms an equal angle of intersection with flow direction 12 in all sections. Lower side wall 57 opposite upper side wall 56 has, for example, two sections. First section 49 forms an angle of intersection a with flow direction 12, and the second section forms an angle of intersection β with flow direction 12 deviating from angle of intersection α. The difference with respect to the channel formation according to FIG. 4a is that lines 53, which are reflected in the region of upper side wall 56 in second section 50, are reflected with an equal angle of intersection α.

Figure 5B:
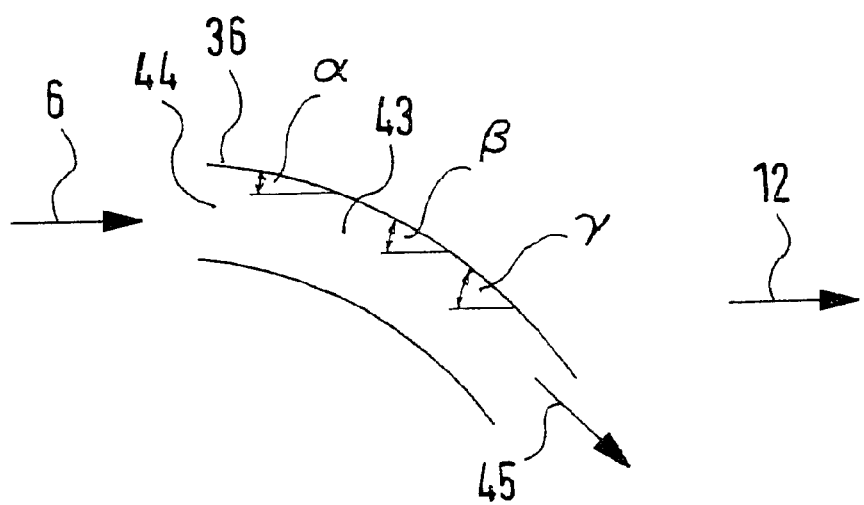
FIG. 5b shows another further exemplary embodiment of the device according to the present invention in partial representation.

FIG. 5b shows a channel 43 whose side wall 36 is continuously curved, so that a different angle of intersection α, β, γ is formed with flow direction 12 at each location of the side wall, the danger of a separation of the flow possibly arising thereby being reduced.

What is claimed is:

1. A device for determining at least one parameter of a flowing medium in the form of a gas/liquid/solid-matter particle mixture flowing in a line having regions of flow, comprising:
    a measuring element arranged in the line and circum-flowed by the flowing medium; and
    at least one protective grating arranged at least partially upstream of the measuring element within the line, the at least one protective grating including:
        at least one channel that at least partially diverts the flowing medium, flowing in a flow direction, downstream after the at least one protective grating, and
        at least one side wall of the at least one channel including at least two sections forming with the flow direction a first angle of intersection and a second angle of intersection that differs from the first angle of intersection so that at least some components of the flowing medium are manipulated to flow in a region of flow that does not impact the measuring element.

2. The device according to claim 1, wherein:
the at least one parameter includes a volumetric flow.

3. The device according to claim 1, wherein:
the flowing medium includes an intake air of an internal combustion engine.

4. The device according to claim 1, wherein:
viewed in the flow direction, a path of motion of solid-matter particles of the flowing medium, due to at least a single reflection at the at least one side wall, after an emergence from the at least one channel, runs in such a way after the at least one protective grating that the path of motion forms a third angle with the flow direction, and the solid-matter particles are led past the measuring element situated further downstream.

5. The device according to claim 1, wherein:
each one of the first angle of intersection and the second angle of intersection has a value that is one of positive and negative.

6. The device according to claim 1, wherein:
the at least one channel is continuously curved in the flow direction.

7. The device according to claim 1, wherein:
the at least one channel includes a channel opening through which the flowing medium gets into the at least one channel, and
a cross-section of the channel opening transverse to the flow direction is at least triangular.

8. The device according to claim 1, wherein:
the at least one channel includes a channel opening through which the flowing medium gets into the at least one channel, and
a cross-section of the channel opening transverse to the flow direction is one of round and oval.

9. The device according to claim 1, wherein:
the first angle of intersection is 25°, and
the second angle of intersection is 35°.

10. The device according to claim 1, further comprising:
a tubular member, through which the flowing medium flows in the flow direction, extending in the line and including a flow-through channel, wherein:
the measuring element is situated in the tubular member.

* * * * *